Patented Oct. 5, 1948

2,450,604

UNITED STATES PATENT OFFICE 2,450,604

TREATMENT OF LIQUID YEAST PRODUCTS

Ben Maizel, Chicago, Ill., assignor to Vico Products Company, Chicago, Ill.

No Drawing. Application September 20, 1945, Serial No. 617,667

10 Claims. (Cl. 99—97)

My invention relates to the treatment of liquid yeast products and is particularly concerned with improving the flavor and taste of such products, especially those which are derived from brewer's yeast. The invention is concerned with the treatment of such liquid yeast products as extracts as well as autolyzed and plasmolyzed products.

Various procedures have heretofore been suggested for removing undesirable odors and flavors from liquid yeast products. Thus, for example, in my Patent No. 2,193,876, issued March 19, 1940, I have disclosed a method for removing the bitter taste from vitamin extracts, prepared, for example, from brewer's yeast. In accordance with said method, the brewer's yeast extract is evaporated under reduced pressure to a syrupy consistency. Upon standing, a portion of the impurities, in the form of gummy constituents which impart bitter taste to the yeast extract, separates out and may be removed, for example, by settling procedures.

In my prior Patent No. 2,364,639, issued December 12, 1944, I have disclosed the removal of objectionable or evil tasting substances from yeast extracts by means of synthetic resins of the type having the property of adsorbing acid-like constituents.

I have now discovered still further improvements in connection with the removal of undesirable tastes and flavors from liquid yeast products, without detrimental effect on the vitamin contents of such products, by certain procedures hereinafter described in detail. My new and improved method may be employed, for example, either on the liquid yeast extracts resulting from the processes described in my aforementioned patents or it may be used in connection with yeast extracts or other liquid yeast products, particularly those derived from brewer's yeast, which contain undesirable constituents which impart objectionable taste and flavor to said liquid yeast products.

In general, my method involves intimately contacting the liquid yeast products with certain addition agents, hereafter described in detail, one particular embodiment of such addition agents comprising carboxylic acid partial esters of aliphatic polyhydroxy substances. Thereafter the partial ester or other addition agent employed is separated from the liquid yeast products. I have found that the constituents present in liquid yeast products which are responsible for the undesirable and objectionable taste and flavor of such products are soluble in the aforementioned partial esters and are, thus, removed when the partial esters are removed after contact with the liquid yeast products. In the preferred practice of my invention, I use partial esters derived from normally solid higher fatty acids so that the partial esters are solid at ordinary or room temperatures. Such partial esters are melted and are added to the liquid yeast products, agitated together therewith to bring about intimate contact between the partial esters and the liquid yeast products, the mass is then allowed to stand substantially quiescent while cooling and then, after the partial ester has solidified, it is removed together with the undesirable flavoring constituents which it has absorbed from the liquid yeast extracts.

In order that the nature of my invention may be more fully understood, the following examples are set forth. It will be understood, however, that said examples are only illustrative and are not to be considered in any way limitative of the true scope of my invention. Thus, for example, different liquid yeast products may be treated, different addition agents may be utilized, the proportions of materials employed may be varied, and other changes may be made all of which are within the spirit of my invention in the light of the guiding principles which I disclose herein.

*Example 1*

An aqueous-alcohol extract of bottom brewer's yeast, prepared, for example, as described in my prior Patent No. 2,193,876, was evaporated to a concentration of approximately 20% solids. To 500 pounds of such concentrated extract disposed in a jacketed container, 25 pounds of molten stearic acid mono-ester of glycerol were added while maintaining said extract above the melting point of said ester. The mixture was thoroughly agitated for about 20 to 30 minutes. It was then allowed to stand quiescent and cold water was then passed through the jacket of the container. When the ester had solidified at the upper surface of the yeast concentrate, said ester was removed mechanically and the concentrate was then filtered to eliminate any suspended solids. The filtrate was found to be substantially free from the bitter taste which usually characterizes it.

*Example 2*

An autolyzed liquid yeast product was prepared from bottom brewer's yeast in known manner using about 2% salt. To 100 pounds of the autolyzed yeast, containing about 25% solids, 5 pounds of the stearic acid mono-ester of propylene glycol were added. The said ester was melted and added to the autolyzed yeast while maintaining the same above the melting temperature of said ester. The mixture was agitated for about 15 minutes, then allowed to stand quiescent for a few minutes, after which it was cooled, as described in Example 1, until the ester had solidified. The ester was then mechanically removed. The autolyzed yeast was found to be relatively free from the bitter taste which normally characterizes it.

Example 3

100 pounds of a plasmolyzed yeast, prepared from washed brewer's yeast in known manner, and containing about 22% solids, were treated with 6 pounds of the stearic acid di-ester of glycerol in the manner described in the above examples. The yeast product was materially improved in taste and flavor.

Example 4

The procedure described in Example 1 was carried out with the exception that the molten stearic acid mono-ester of glycerol was replaced by a molten mixture of 25 pounds of a 10% solution of octadecyl amine in partially hydrogenated coconut oil (95 degrees F. melting point).

Example 5

The procedure described in Example 2 was carried out with the exception that the molten stearic acid mono-ester of propylene glycol was replaced by a molten mixture of 6 pounds of a 15% solution of morpholine stearate in partially hydrogenated cottonseed oil (98 degrees F. melting point).

Those of the addition agents which I utilize in accordance with my invention and which are in the form of partial esters serve, in effect, to scavenge the liquid yeast products of their bitter constituents. They accomplish this result without prejudice to the desired retention of the vitamin content of the liquid yeast products. Illustrative examples of the partial esters are the stearic acid mono-esters of ethylene glycol, diethylene glycol, triethylene glycol, and their higher homologues; stearic acid mono- and di-esters of polyglycerols such as diglycerol, triglycerol, tetraglycerol and mixtures thereof; stearic acid mono- and di-esters of sugar alcohols and like polyhydric alcohols such as mannitol, sorbitol, dulcitol, arabitol, mannitan, and sorbitan; palmitic acid partial esters of the foregoing polyhydric alcohols, and the like.

The carboxylic acids or their acylating derivatives which may be used in the preparation of the partial esters of the aliphatic polyhydroxy substances, which are used in accordance with my present invention, may be selected from a large group such as the following: caproic acid, enanthic acid, caprylic acid, pelargonic acid, capric acid, sebacic acid, behenic acid, arachidic acid, cerotic acid, erucic acid, melissic acid, stearic acid, oleic acid, ricinoleic acid, ricinelaidic acid, ricinostearolic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil and other fish oils, partially or completely hydrogenated animal and vegetable oils such as those mentioned; oxidized hydroxy and alpha-hydroxy higher carboxylic, aliphatic and fatty and/or polymerized higher fatty acids or higher fatty acids derived from oxidized and/or polymerized triglyceride oils; acids such as 1-hydroxy stearic acid, dihydroxypalmitic acid, dihydroxystearic acid, dihydroxybehenic acid, alpha-hydroxy capric acid, alpha-hydroxy stearic acid, alpha-hydroxy palmitic acid, alpha-hydroxy lauric acid, alpha-hydroxy myristic acid, alpha-hydroxy coconut oil mixed fatty acids, alpha-hydroxy margaric acid, alpha-hydroxy arachidic acid, and the like; fatty and similar acids derived from various waxes such as beeswax, spermaceti, montan wax, coccerin, and carnauba wax and higher molecular weight carboxylic acids derived, by oxidation and other methods, from paraffin wax, petroleum and similar hydrocarbons; resinic and hydroaromatic acids such as hexahydrobenzoic acid, naphthenic acid and abietic acid; araliphatic and aromatic acids such as phthalic acid, benzoic acid, Twitchell fatty acids, naphthoic acid, pyridine carboxylic acid; hydroxyaromatic acids such as salicylic acid, hydroxy benzoic and naphthoic acids, and the like. It will be understood that mixtures of any two or more of said acids may be employed if desired and it will also be appreciated that said acids may contain substituent groups. Of particular utility are the unsubstituted normally solid fatty acids containing from sixteen to eighteen carbon atoms.

The aliphatic polyhydroxy substances used in the preparation of the partial esters described herein may also be selected from a large class and include, among these mentioned, glycerol; glycols such as ethylene glycol, propylene glycol, trimethylene glycol, butylene glycol and the like; polyglycols such as diethylene glycol, triethylene glycol and tetraethylene glycol; pentaerythritol; quercitol; dihyroxy acetone, triethanolamine; tripropanolamine; polyglycerols such as diglycerol, triglycerol, tetraglycerol and the like including mixtures thereof; carbohydrates and sugars including mono-, di- and polysaccharides such as dextrose, sucrose, xylose, arabinose, glactose, fructose, maltose, mannose, dextrin, starch, and the like; the natural and synthetic simple and complex glucosides; sugar alcohols such as arabitol, mannitol, mannitan, sorbitol, sorbitan, and dulcitol; alkylene, such as ethylene, oxide derivatives of said sugar alcohols; and polyhydroxy-carboxylic acids such as tartaric acid, mucic acid, saccharic acid, gluconic acid, glucuronic acid, gulonic acid, mannonic acid, trihydroxyglutaric acid, glyceric acid, carboxylic oxidation products of polyglycerols, others of similar character, and hydroxyethyl and hydroxypropyl ether derivatives of the above, as, for example;

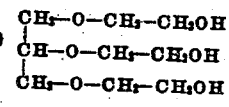

The addition agents should be of such character as not only to absorb the undesired flavoring constituents present in the liquid yeast products but such addition agents should thereafter be reasonably readily separable from the liquid yeast products. To this end, such addition agents, while possessing some emulsifying characteristics, should not be of a type which will form a stable or permanent emulsion with the liquid yeast solutions. In order to overcome this tendency to form stable emulsions, it is desirable to admix the addition agent proper with a substantial amount of an animal or vegetable oil or fat, preferably a vegetable fat having a melting point of about 95–110 degrees F. Illustrative examples of such oils or fats are cottonseed oil, coconut oil, stearin and partially hydrogenated coconut and cottonseed oils. The addition composition may contain from about 50–90% of oil. Other addition agents, which may be employed, especially in conjunction with a vegetable fat, are dodecyl amine, cetyl alcohol, and stearyl alcohol. In general, the addition agents are of a fatty or waxy character.

The liquid yeast product, in most cases, should contain from about 10% to about 35% of solids prior to treatment with the addition agents, if the best results of the invention are to be obtained, and I prefer that the solids content should be from about 20% to about 30%. If the liquid yeast products contain only small proportions of solids, they may be concentrated, preferably in vacuo and at low temperatures, before treatment in accordance with my present invention.

The proportions of partial esters, or other addition agents or addition compositions, to liquid yeast products, used in carrying out the process of my invention, are subject to wide variation. In general, proportions of about 3% to about 20% of partial ester or the like, based on the weight of the liquid yeast products, are satisfactory, and, in the ordinary case, I prefer to use about 5% to about 10%. The addition agents may, in many cases, after treatment of the liquid yeast products, be reused in treating subsequent batches of liquid yeast products. After repeated use, they become contaminated and may either be discarded or treated by steam and washing treatments to recondition them for further use in the process.

As I have pointed out above, I find it especially satisfactory to use partial esters which are normally solid at about room temperatures. Such partial esters should be such as to melt at temperatures below about 200 degrees F. The use of such partial esters enables them to be separated from the liquid yeast products after treatment thereof by the simple procedure described above, namely, by solidification at the upper surface of the liquid yeast products and removal mechanically. Where the partial esters utilized are liquids at ordinary or room temperatures, they may be separated from the treated liquid yeast products in any suitable manner, for example, by centrifugal means. The partial esters have a specific gravity different from the specific gravities of the liquid yeast products and, being not miscible therewith, may be separated by the usual means employed for separating materials having such characteristics.

While I have described my invention in detail, it will be understood that the scope thereof is not to be limited except as set forth in the claims.

This application is a continuation-in-part of my prior application, Serial No. 537,977, filed May 29, 1944, and now abandoned.

What I claim and desire to protect by Letters Patent of the United States is:

1. In a method of removing undesired flavoring constituents from liquid yeast products, the steps which comprise intimately contacting said liquid yeast products with a higher molecular weight carboxylic acid partial ester of an aliphatic polyhydroxy substance, and then removing said ester with such undesired flavoring constituents as it has absorbed from the liquid yeast extracts.

2. In a method of removing undesired flavoring constituents from liquid yeast products, derived from brewer's yeast, the steps which comprise intimately contacting said liquid yeast products with a normally solid higher molecular weight carboxylic acid partial ester of an aliphatic polyhydroxy substance, at a temperature sufficiently elevated so that said ester is in molten state, then allowing the mass to stand substantially quiescent while cooling, and then, after said ester has solidified, removing said ester with such undesired flavoring constituents as it has absorbed from the liquid yeast products.

3. In a method of removing undesired flavoring constituents from liquid yeast products derived from brewer's yeast, the steps which comprise intimately contacting said liquid yeast products with a higher molecular weight fatty acid partial ester of an aliphatic polyhydroxy substance in liquid form, and then removing said ester with such undesired flavoring constituents as it has absorbed from the liquid yeast products.

4. In a method of removing undesired flavoring constituents from liquid yeast products, the steps which comprise agitating said liquid yeast products with a higher molecular weight fatty acid partial ester of an aliphatic polyhydroxy substance in liquid form, and then removing said ester with such undesired flavoring constituents as it has absorbed from the liquid yeast products.

5. In a method of removing undesired flavoring constituents from yeast extracts in the liquid state, derived from brewer's yeast, the steps which comprise intimately contacting said liquid yeast extracts with a higher molecular weight fatty acid partial ester of an aliphatic polyhydroxy substance to effect absorption of said undesired flavoring constituents by said ester, and then separating said ester with such undesired flavoring constituents as it has absorbed from the liquid yeast extracts.

6. In a method of removing undesired flavoring constituents from yeast extracts in the liquid state, derived from brewer's yeast, the steps which comprise agitating said liquid yeast extracts with a normally solid higher molecular weight fatty acid partial ester of an aliphatic polyhydroxy substance, said agitation being effected at a temperature sufficiently elevated so that said ester is in a molten state, then allowing the mass to stand substantially quiescent while cooling, and then, after said ester has solidified, removing said ester with such undesired flavoring constituents as it has absorbed from the liquid yeast extracts.

7. In a method of removing undesired flavoring constituents from liquid yeast products, the steps which comprise agitating said liquid yeast products with a normally solid higher molecular weight fatty acid partial ester of an aliphatic polyhydroxy substance, said agitation being effected at a temperature sufficiently elevated so that said ester is in a molten state, then allowing the mass to stand substantially quiescent while cooling, and then, after said ester has solidified, removing said ester with such undesired flavoring constituents as it has absorbed from the liquid yeast products.

8. In a method of removing undesired flavoring constituents from liquid yeast products, derived from brewer's yeast, the steps which comprise agitating said liquid yeast products with a stearic acid partial ester of an aliphatic polyhydroxy substance selected from the group consisting of glycerol, glycols, polyglycerols, and sugar alcohols, said agitation being effected at a temperature sufficiently elevated so that said ester is in a molten state, then allowing the mass to stand substantially quiescent while cooling, and then, after said ester has solidified, removing said ester with such undesired flavoring constituents as it has absorbed from the liquid yeast extracts.

9. In a method of removing undesired flavoring constituents from yeast extracts in the liquid state, derived from brewer's yeast, the steps which comprise agitating said liquid yeast extracts with a normally solid fatty acid partial ester of an aliphatic polyhydroxy substance selected from the group consisting of glycerol, glycols, polyglycerols, and sugar alcohols, the fatty acid radical of said partial ester containing from 16 to 18 carbon atoms, said agitation being effected at a temperature sufficiently elevated so that said ester is in a molten state, then allowing the mass to stand substantially quiescent while cooling, and then, after said ester has solidified, removing said ester with such undesired flavoring constituents as it has absorbed from the liquid yeast extracts.

10. In a method of removing undesired flavoring constituents from plasmolyzed yeast products in the liquid state, derived from brewer's yeast, the steps which comprise agitating said liquid yeast products with a normally solid higher molecular weight fatty acid partial ester of an aliphatic polyhydroxy substance, said agitation being effected at a temperature sufficiently elevated so that said ester is in a molten state, then allowing the mass to stand substantially quiescent while cooling, and then, after said ester has solidified, removing said ester with such undesired flavoring constituents as it has absorbed from the liquid yeast products.

BEN MAIZEL.

REFERENCES CITED

The following references are of record in the file of this patent:

UNITED STATES PATENTS

| Number | Name | Date |
| --- | --- | --- |
| 2,136,339 | Schultz | Nov. 15, 1938 |
| 2,193,876 | Maizel | Mar. 19, 1940 |
| 2,223,464 | Schultz | Dec. 3, 1940 |
| 2,223,465 | Schultz | Dec. 3, 1940 |
| 2,364,639 | Maizel | Dec. 12, 1944 |

FOREIGN PATENTS

| Number | Country | Date |
| --- | --- | --- |
| 24,294 | Great Britain | 1903 |
| 134,168 | Great Britain | Apr. 30, 1919 |